Dec. 27, 1966  R. A. D. SCHWARTZ  3,294,964
POLARIZED CEILING PANEL
Original Filed Jan. 11, 1963
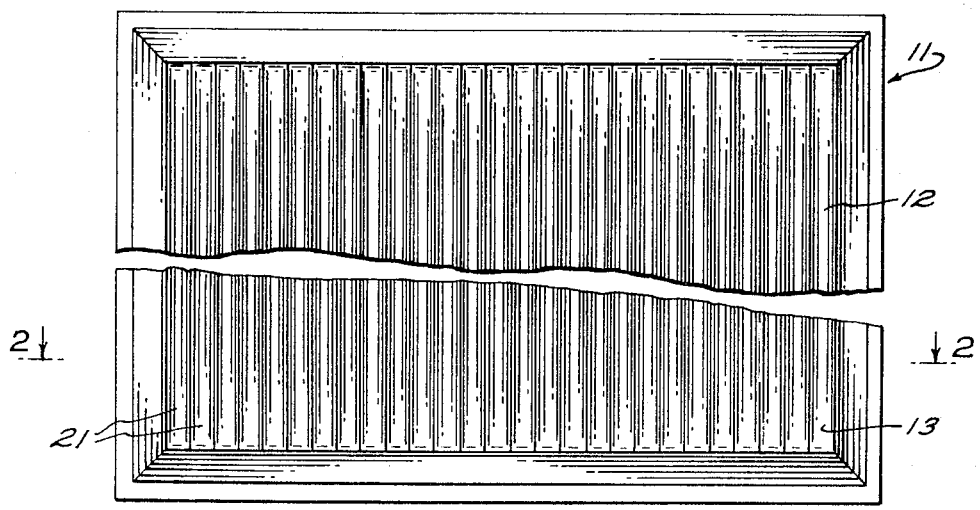
Fig.1.
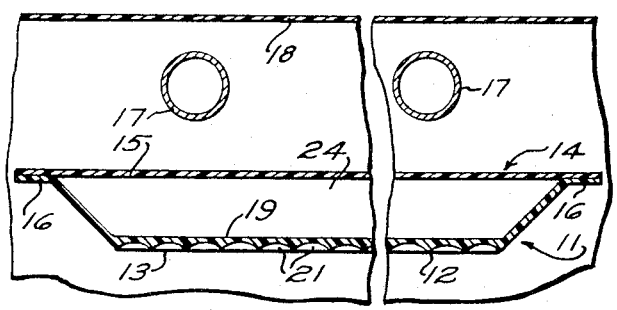
Fig.2.
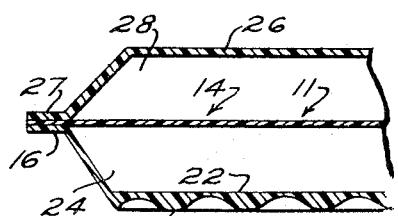
Fig.3.
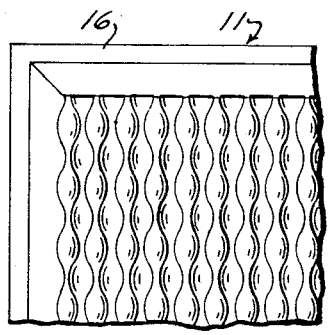
Fig.4.
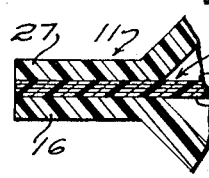
Fig.6.
Fig.5.
INVENTOR
ROBERT A. D. SCHWARTZ
BY
Gardner & Zimmerman
ATTORNEY.

United States Patent Office 3,294,964
Patented Dec. 27, 1966

3,294,964
POLARIZED CEILING PANEL
Robert A. D. Schwartz, % United Lighting and Ceiling Company, 2828 Ford St., Oakland, Calif. 94601
Continuation of application Ser. No. 250,804, Jan. 11, 1963. This application Sept. 20, 1965, Ser. No. 488,641
10 Claims. (Cl. 240—9.5)

This application is a continuation of application Serial No. 250,804 filed January 11, 1963. This invention relates generally to ceiling panels used for illumination purposes, and more particularly is directed to a panel having advantageous polarizing effects and also having desirable acoustical properties.

It is well known in the field of illumination that artificial light is highly susceptible to causing undesirable glare and low visual acuity in illuminating a given object. This phenomenon has been generally explained as being caused by a portion of the incident light reflecting directly from the surface of the object without having penetrated to the object's pigments. The portion of the light that does refract into the object beyond its surface is scattered and reflected from the object in accordance with the pigment characteristics of the regions below the surface, and serves to convey to the observer the actual features of the object, as for example its color, texture, and the like. However, the presence of the directly reflected component of the incident light tends to interfere with the refracted component, and reduces the contrast with which the object is viewed in comparison to its surroundings. An example of this phenomenon is presented where a desk has a sheet of glass placed over its top. The light reflected from the glass will, from various angles, completely prevent the wood grain of the desk top from being seen, and often causes a glare which is very disturbing to the eyes.

It has been found that light polarized normal to the plane of incidence with respect to a given object has the desirable characteristic of being absorbed into the object, and thereby evidences no component of light reflected directly from the object's surface. The plane of incidence is taken as that including the incident and reflected rays. In comparison, light polarized in the plane of incidence is characterized by substantially no penetration, and thus is apt to cause glare and low visual acuity.

Conventional multilayer polarizing sheets have been found suitable for creating what is known as radially polarized light. More particularly, if unpolarized light is transmitted from a point source through a multilayer polarizing sheet, the resulting light will be uniformly polarized with respect to all radial directions from the source. The rays contained in a conical sheet of transmitted light each have planes of polarization normal to the plane of incidence of the respective ray relative to the polarizing sheet.

It has also been found, however, that maximum polarization occurs in light that is incident on the polarizing sheet at an angle equal to Brewster's angle. For most materials this angle is in the vicinity of 57 degrees, as measured from the vertical. Thus, in previous polarizing systems, maximum contrast, and hence greatest visual acuity, has occurred with respect to light having its plane of polarization at 57 degrees.

In viewing a given object, only a small portion of the light reflected to the observer will have its plane of polarization at 57 degrees. Thus, for the most part, the light actually being observed has heretofore not benefitted to the fullest extent from the desirable characteristics of polarization.

It is accordingly a main object of the present invention to provide a device for changing the plane of polarization of polarized light into a relatively wide range of angles whereby an improved and more useful type of polarized lighting effect is achieved.

A further object of the invention is to provide a device for use in conjunction with a multilayer polarizing sheet to increase the percentage of polarization over a range of angles of resultant light differing from Brewster's angle for a given polarizing sheet.

Another object of the invention is to provide a ceiling panel of the type described having improved polarizing characteristics, and in addition being adapted with improved acoustical properties for reducing the sound reflected from the panel.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a plan view of a ceiling panel comprising one embodiment of the invention;

FIGURE 2 is a cross-sectional view taken along the plane 2—2 as shown in FIGURE 1, and shows the structure of FIGURE 1 operatively disposed with respect to a ceiling and lighting fixtures mounted thereon;

FIGURE 3 is a cross-sectional view similar to that of FIGURE 2 illustrating a modified form of the invention;

FIGURE 4 is a fragmentary plan view of another alternative embodiment of the invention; and FIGURE 5 is a plan view of a further modified ceiling panel.

FIGURE 6 is an enlarged view of a portion of the structure shown in FIGURE 3.

In broad terms, the ceiling panel of the present invention is adapted to take polarized light having a given plane of polarization and change this plane into a range of angles thereby affording greater utilization of the polarized light. To achieve this effect, the instant panel is provided with a prismatic light refracting sheet disposed subjacent a multilayer polarizing sheet. Polarized light coming through the multilayer sheet is subsequently directed through the prismatic sheet, and refracted over a range of angles and the resultant light is thus adapted for substantial absorption into an object at other than only Brewster's angle.

Referring to the drawing, there is shown in FIGURE 1 a ceiling panel 11 having a prismatic refracting sheet 12 as viewed from its lower surface 13. In FIGURE 2 the panel 11 is seen to include a multilayer polarizing sheet 14 disposed adjacent and substantially cotermious with the prismatic sheet 12. As is understood in the art and as best shown in FIGURE 6, the polarizing sheet 14 generally includes a plurality of laminated transparent layers having suitable indices of refraction, whereby the aforenoted radial polarization effect can be provided. By way of example, the sheet 14 may be formed of a plurality of layers 15 of clear plastic film of about .001 inch thickness. Preferably, the prismatic sheet 12 is spaced from the sheet 14, and is secured thereto by means of flanged side portions 16. The flanged portions 16 can either be glued or heat sealed to the sheet 14, inasmuch as both sheets are preferably made from suitable plastic materials.

When used as a part of a ceiling construction, the panel 11 is positioned beneath a number of conventional lighting fixtures, as for example the fluorescent lamps 17 as shown in FIGURE 2. A highly reflecting surface 18 is preferably disposed above the lamps 17 to maximize the quantity of light available. Light from the lamps 17 is thus directed through the polarizing sheet 14, and then through the prismatic sheet 12.

As noted above, the light transmitted through the polarizing sheet 14 has the largest percentage of polarization at Brewster's angle, or approximately 57 degrees. Light traveling at other angles has a relatively lower extent of polarization. When the polarized light is transmitted through the sheet 12, however, the resultant light directed into the regions being illuminated has a notably increased percentage of polarization at angles other than 57 degrees. This is partially explained by the discovery that as the light rays are bent upon transmission through the prism, the planes of polarization of the rays are also changed. As a result, the objects being illuminated may be viewed with much greater visual acuity, inasmuch as the light actually being received from the object by the viewer has had a larger percentage of polarization than has been heretofore possible.

With respect to the construction of the prismatic sheet 12, the upper surface 19 of the sheet as shown in FIGURE 2 is preferably smooth. The lower surface 13, however, is formed of a series of concave regions 21 or undulations. Thus, as shown in the drawing, the upper or incident surface has a continually changing angular relationship with respect to the lower surface and the thickness of the sheet 12 is varied throughout its planar extent. The result is, in effect, a plurality of prisms disposed laterally adjacent one another which serve to change the plane of maximum polarization of the light from the sheet 14 into a wider range of useful polarized light as described hereinabove.

In addition to the prismatic sheet depicted in FIGURE 2, other configurations have been found useful. For example, in FIGURE 3 a prismatic sheet 22 is shown as having a lower surface 23 with generally sinusoidal type undulations to provide the continually changing angular relationship of this surface with respect to its upper surface. Another form of prismatic sheet having a continually changing angular relationship between its surfaces may be constructed in accordance with the plan view shown in FIGURE 4. And still another type of prism can be made with a generally diamond-shaped surface as shown in FIGURE 5.

The various types of prismatic sheets suitable for use in accordance with the present invention can be readily constructed from transparent plastic sheets. By embossing one of the surfaces with a suitable die, either when the sheet is initially being formed or thereafter, prisms of varying configurations and designs may be provided.

A further feature of the invention is noted with respect to the acoustical properties of the panel 11. More specifically, the panel is preferably constructed with the sheets 12 and 14 being spaced apart, whereby a trapped air space 24 is enclosed therebetween. Sound directed at the panel is dampened by this enclosed volume of air, and hence the sound reflected from the panel is appreciably reduced. This feature is very important when the entire surface of a ceiling is constructed of lighting panels, inasmuch as there is no room for conventional acoustical tiles. Further advantage in this regard may be provided by the modified structure shown in FIGURE 3, wherein a transparent sheet 26 is spaced above the sheet 14 to define a second trapped large air space 28, whereby the sound energy will be further dissipated. Sheet 26 is secured to the sheet 14 by means of flanged side portions 27 in the same manner as the prismatic sheet 12.

In addition to the sound absorbing or dampening effect of the air spaces or chambers 24 and 28, the polarizing sheet 14 may itself be constructed in such a manner as to give further acoustical properties to the panel. In this connection, if the layers 15 are secured together only at their heat sealed or other sealed connection to the flange portions 16 and 27 of sheets 12 and 26, it will be clear that a layer of air will be provided between each layer 15. Since there will usually be provided a substantial number of layers 15, e.g., ten to twenty, a large amount of sound will be absorbed in passing between the adjacent layers of plastic sheet and air spaces.

As an example of the improved visual characteristics achieved by the ceiling panel of the present invention, the tabulations of an experiment are given as follows. In this experiment a prismatic sheet substantially the same as that shown in FIGURES 1 and 2 was used. The percentage of polarization at various angles was measured with respect to light transmitted through a conventional multilayer polarizing sheet, first without the prismatic sheet and then with it. Percent polarization was determined by the difference between horizontal and vertical polarization measurements, divided by the sum. This may be expressed by the formula:

$$\text{Percent polarization} = \frac{B_v - B_h}{B_v + B_h}$$

The angle is measured from the vertical, and was observed for the prismatic sheet at right angles to the longitudinal direction of the generally elongated prisms, and parallel to these prisms.

| Angle | Percent Polarization without prisms | Percent Polarization rt. angle to prisms | Percent Polarization parallel to prisms |
| --- | --- | --- | --- |
| 0° | 2.0 | 2.0 | 2.0 |
| 25° | 11.0 | 22.0 | 7.0 |
| 40° | 29.0 | 38.0 | 37.0 |
| 60° | 51.0 | 52.0 | 45.0 |

From the foregoing chart it is apparent that the percentage of polarization is notably increased at angles in the range of 25°–40° which is the range at which most visual tasks are performed. Consequently, the useful polarization is much improved over that heretofore provided by conventional polarizing systems.

What is claimed is:

1. A ceiling panel for reducing undesirable reflection of illuminating light to an observer from an area being illuminated comprising polarizing means for intercepting the illuminating light before it reaches said area, said polarizing means transmitting said intercepted light as polarized light having a maximum percentage of polarization at an incidence angle corresponding to Brewster's angle for said polarizing means and lesser percentages of polarization at angles other than Brewster's angle, and a light refractive prismatic sheet means disposed to intercept said polarized light, substantially the entire incident surface of said prismatic sheet means having a continually changing angular relationship with respect to the opposite surface, said light refractive prismatic sheet means refracting light having maximum percentage of polarization at Brewster's angle over a range of emergent angles between 25° and 40° at which said area is to be viewed, and means for mounting said polarizing means and said light refractive prismatic sheet means to a ceiling structure having a source of illuminating light.

2. The ceiling panel of claim 1 wherein said means for mounting will hold the ceiling panel disposed horizontally.

3. The ceiling panel of claim 1 wherein the incident surface of said prismatic sheet means is substantially flat and the opposite surface thereof is undulated to provide said substantially continually changing angular relationship therebetween.

4. A ceiling panel to be mounted to receive randomly directed light from an artificial source of light comprising a multi-layer polarizing sheet means for intercepting a portion of the light emitted from said source, said polarizing sheet means transmitting said intercepted light as polarized light having a maximum percentage of polarization at an incidence angle corresponding to Brewster's angle for said polarizing sheet means and lesser percentages of polarization at angles other than Brewster's angle, and a light refractive prismatic sheet means disposed to intercept said polarized light from said polarizing sheet means, substantially the entire incident surface of said prismatic sheet means having a continually changing angular relationship with respect to the opposite surface, said light refractive prismatic sheet means refracting light having maximum percentage of polarization at Brewster's angle over a range of angles between 25° and 40°, and means for mounting said polarizing sheet means and said light refractive prismatic sheet means to a ceiling structure having a source of illuminating light.

5. The ceiling panel of claim 4 wherein said multilayer polarizing sheet means transmits said light as radially polarized light and said prismatic sheet means is adapted to be disposed horizontally.

6. The ceiling panel of claim 5 wherein the incident surface of said prismatic sheet means is substantially flat and the opposite surface thereof is undulated to provide said substantially continually changing angular relationship therebetween.

7. The ceiling panel of claim 5 wherein said polarizing sheet means and said prismatic sheet means are spaced apart and enclose a volume of air whereby said panel also acts as an acoustical dampener.

8. The ceiling panel of claim 5 wherein the layers of said multi-layer polarizing sheet means are spaced apart to defined air spaces whereby said panel also acts as an acoustical dampener.

9. A ceiling construction which includes means for illuminating the underlying area and which comprises at least one source of randomly directed artificial light, a light reflective means disposed above said source for reflecting said light randomly downward toward the area to be illuminated, and a ceiling panel including means for mounting the same horizontally subjacent said source for receiving the light emitted from said source, said ceiling panel comprising a multi-layer polarizing sheet means for intercepting said light and transmitting same as radially polarized light having a maximum percentage of polarization at an incident angle corresponding to Brewster's angle for said polarizing sheet means and lesser percentages of polarization at angles other than Brewster's angle and a light refractive prismatic sheet means disposed to intercept said radially polarized light from said polarizing sheet means, the incident surface of said prismatic sheet means being substantially flat and the opposite surface thereof being undulated to provide a substantially continually changing angular relationship between said surfaces, said prismatic sheet means refracting light to decrease the amount of polarized light emanating from said panel at Brewster's angle and increase the amount emanating over a range of angles between 25° and 40°.

10. A ceiling construction which includes means for illuminating the underlying area and which comprises at least one source of randomly directed artificial light, a light reflective means disposed above said sources for reflecting said light randomly downward toward the area to be illuminated, a multi-layer polarizing sheet means disposed horizontally subjacent said source for intercepting said light and transmitting same as radially polarized light having a maximum percentage of polarization at an incidence angle corresponding to Brewster's angle for said polarizing sheet means and lesser percentages of polarization at angles other than Brewster's angle, a light refractive prismatic sheet means disposed horizontally below said multi-layer polarizing sheet means to intercept said radially polarized light from said polarizing sheet means, substantially the entire incident surface of said prismatic sheet means having an angular relationship with respect to the opposite surface thereof to refract light having maximum percentage of polarization at Brewster's angle over a range of emergent angles between 25° and 40° at which said area is to be viewed to decrease the amount of polarized light emanating from said ceiling construction at Brewster's angle and increase the amount emanating over said range of angles and means for mounting said polarizing sheet means and prismatic sheet means in said ceiling construction.

References Cited by the Examiner

UNITED STATES PATENTS

| 2,700,919 | 2/1955 | Boone | 88—65 |
| 3,024,701 | 3/1962 | Marks et al. | 240—9.5 X |
| 3,069,974 | 12/1962 | Marks et al. | 88—65 |

FOREIGN PATENTS 457,443  11/1936  Great Britain.

NORTON ANSHER, *Primary Examiner.*